May 22, 1934.　　　M. MAJOR ET AL　　　1,959,434
MOTION PICTURE SCREEN AND METHOD OF MAKING THE SAME
Filed July 2, 1930　　2 Sheets-Sheet 1
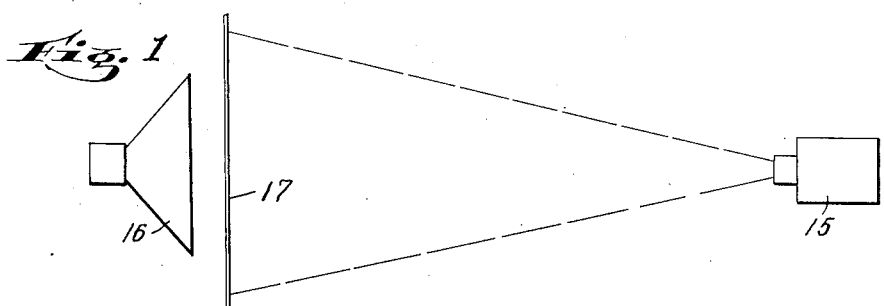
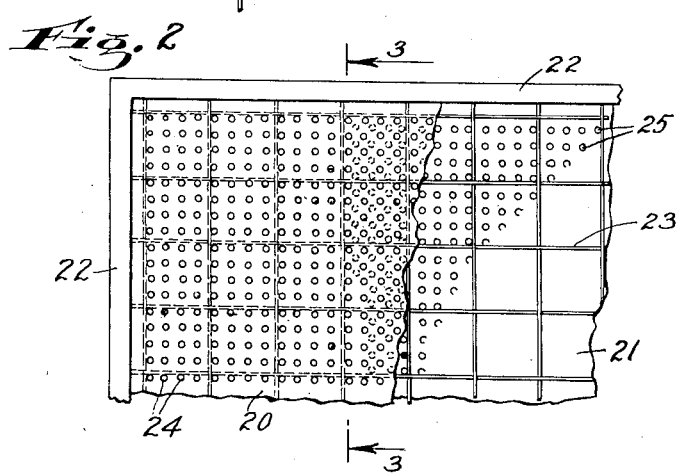
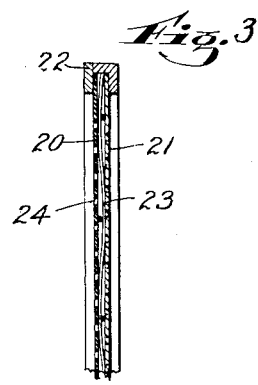
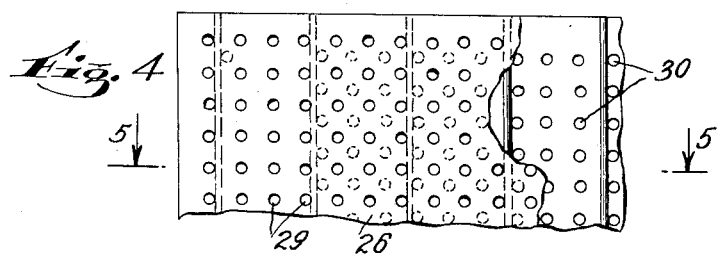
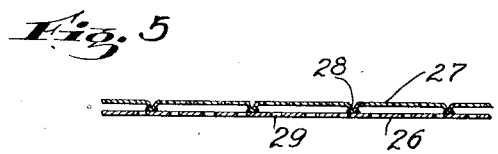
INVENTORS
MILTON MAJOR
BY HENRY H. RENNELL
ATTORNEY May 22, 1934.　　　M. MAJOR ET AL　　　1,959,434
MOTION PICTURE SCREEN AND METHOD OF MAKING THE SAME
Filed July 2, 1930　　2 Sheets-Sheet 2
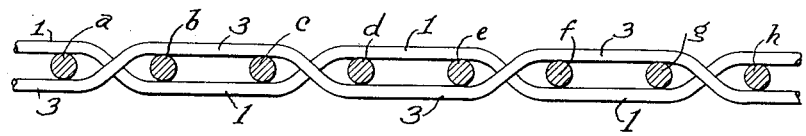
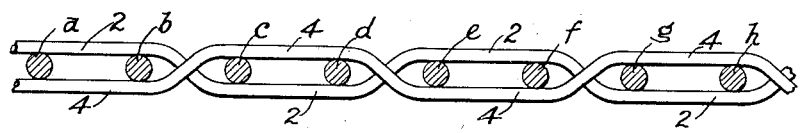
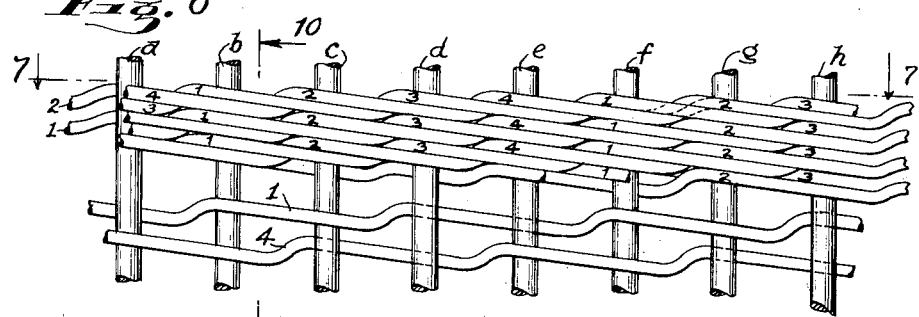
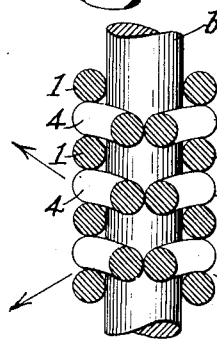
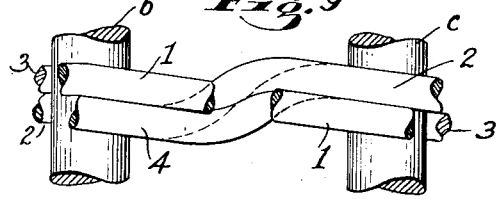
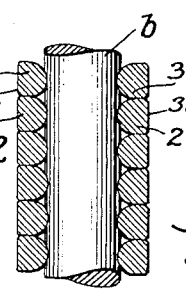
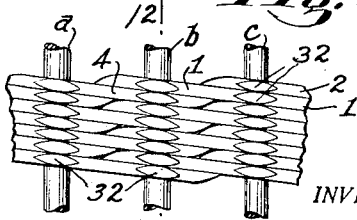
INVENTORS
MILTON MAJOR
HENRY H. RENNELL
BY
ATTORNEY Patented May 22, 1934

1,959,434

UNITED STATES PATENT OFFICE 1,959,434

MOTION PICTURE SCREEN AND METHOD OF MAKING THE SAME

Milton Major, New York, N. Y., and Henry H. Rennell, Southport, Conn., assignors to The C. O. Jelliff Mfg. Corp., Southport, Conn., a corporation of Connecticut Application July 2, 1930, Serial No. 465,342

16 Claims. (Cl. 88—24)

Our invention relates to motion picture projection and more particularly to improvements in screens therefor.

An object of the invention is to provide a screen which will possess excellent light reflecting properties, but which, at the same time, will be readily pervious to sound waves. Such a screen is highly desirable for use in so-called "sound pictures", wherein sound records are combined and synchronized with cinematographic projection. It is customary to place one or more loud speakers or amplifier horns immediately behind the screen so that the sound will appear to come from the persons or objects depicted on the screen. To permit the sound to pass readily through the screen it has been the practice heretofore to form the screen with small openings therethrough. Unfortunately, these openings rob the screen of just so much light reflective surface and to make up for this deficiency it has been necessary to increase the intensity of the light source. However, this introduces the further problem of dissipating the increased heat generated which in view of the highly inflammable nature of the film is an important consideration. The present tendency is toward the building of larger theaters which calls for more powerful projecting apparatus and hence the importance of obviating any construction or arrangement which will rob the screen of part of its reflecting surface. There is also a trend toward the use of colored pictures which absorb a large part of the light passing through the film and hence require a screen of high reflecting capacity.

It is an object of our invention to overcome the difficulties above enumerated by providing a screen having sound passages running therethrough, but in which the passages are of such character that the rays of light projected on the screen cannot pass directly through them. Thus, with our screen we are able to obtain sound reproduction of high amplitude without materially reducing luminosity because our screen is impervious to the projected rays of light but is pervious to the sound waves.

While our invention is adapted to be incorporated in screens made of textile fabrics, we find material advantages in making the screen of metal. Such metal screens are completely fireproof whereas the textile fabrics heretofore used for screens are not completely fireproof, even when subjected to a fireproofing treatment.

Another advantage of using metal screens, particularly for sound pictures, is to be found in the resonant quality of the screen which results in less absorption of sound by the screen itself.

Another object of the present invention is to provide a new process of making a form of metallic screen for sound picture projection.

Other objects and advantages of our invention will appear in the following description of certain embodiments and thereafter the novelty and scope of the invention will be pointed out in the claims.

In the accompanying drawings;

Figure 1 is a diagrammatic view of a motion picture projector and a sound projector or amplifier, with out improved screen therebetween;

Fig. 2 is a fragmental view of a double layered screen with spacing elements between the layers;

Fig. 3 is a view in section taken on the line 3—3 of Fig. 2;

Fig. 4 is a fragmental view of another form of double layered screen in which one of the layers is provided with ribs to maintain a uniform spacing between the layers;

Fig. 5 is a view in section taken on the line 5—5 of Fig. 4;

Fig. 6 is a view on an enlarged scale of a double layered screen formed of woven wire;

Fig. 7 is a view in section taken on the line 7—7 of Fig. 6, but showing only two of the weft wires;

Fig. 8 is a similar view showing the next two adjacent weft wires;

Fig. 9 is a fragmental plan view of a small portion of Fig. 6 on a still larger scale showing how the weft wires lap over one another to form the double layer screen;

Fig. 10 is a view in section on an enlarged scale taken on the line 10—10 of Fig. 6;

Fig. 11 is a fragmental plan view of the double layered woven wire screen showing its appearance after being subjected to a calendering operation; and Fig. 12 is a view in section on an enlarged scale taken on the line 12—12 of Fig. 11.

In Fig. 1, we show the usual sound picture apparatus comprising a projector 15 and a sound amplifier 16 with our improved screen 17 between the two and preferably close to the amplifier.

The screen shown in Figs. 2 and 3 comprises two parallel sheets 20 and 21 which may be composed of a textile fabric or of any other suitable material. These sheets are preferably stretched taut between suitable supports. In the drawings such supports are shown in the form of a rigid frame 22. The sheets are mounted in mutually spaced relation but to prevent one sheet from contacting with the other under the influence of drafts or unequal expansion due to weather conditions or other causes, we prefer to insert a spacer between the sheets. This spacer may consist, as shown in Figs. 2 and 3, of a coarse mesh wire fabric 23. The wires of this fabric may be interwoven (as shown) or not, as desired.

As shown in the drawings, the sheet 20 is formed with perforations 24 and the sheet 21 is provided with perforations 25 so that there is no clear passage for light rays coming from the projector to penetrate the screen. However, since sound waves do not have to travel in straight lines they will readily pass through the offset perforations and penetrate the screen.

Assuming that the sheet 20 is on the side of the screen facing the projector, it will be important that the outer face of sheet 20 and the inner face of sheet 21 present good reflecting surfaces, this being obtained either by suitable treatment or by plating or coating or by making the sheets of a material which in its natural state or when polished will present the desired surface. The spacing of the sheets 20 and 21 should be so close that there will be little loss of light. Under ordinary conditions, the angle of incidence of the projected rays is seldom more than 15 degrees. As a consequence, most of the light which passes through the perforations 24 will find its way back again through the same perforations and only a small proportion will be lost. The closer the spacing of the sheets 20 and 21 the less will be such loss and it is preferable to make such spacing less than the diameter of the perforations 24. The perforations 25 on the other hand have no effect upon the light reflecting properties of the screen, so long as they are sufficiently offset so as not directly to pass any of the projected rays which penetrate the screen 20.

The spacer 23, as explained above, may consist of woven wire, but to prevent the wire from producing rattling noises as it is vibrated by the sounds penetrating the screen, it may either be coated with a sound deadening material or it may be wrapped with thread. This is particularly important in case one or both of the sheets 20 and 21 are of metal. If the sheets are composed of sound deadening material bare wire may be used for the spacer 23, but in such case, it is preferable to solder or weld the wires at their points of intersection.

The construction shown in Figs. 4 and 5 is similar to that already described in that the screen is composed of two sheets 26 and 27 each of which is perforated. The sheet 26 forms the front face of the screen, that is, the face on which the picture is to be projected, and the rear sheet 27 is provided with ribs 28 which serve as spacers to maintain uniform spacing of the two sheets. In this construction, the sheet 27 is preferably formed of metal while the sheet 26 may, if desired, be formed of a textile fabric. However, we prefer to form the sheet 26 also of metal and to solder the latter to the ribs 28. The ribs 28 thus not only serve to space the sheets apart but provide stiffening members which assist in holding the screen to a true plane surface. The perforations 29 in the screen 26 are offset with respect to the perforations 30 in the sheet 27. As in the screen shown in Figs. 2 and 3, most of the light projected through the perforations 29 will be reflected from the inner surface of the sheet 27 and back through said perforations. However, sound waves can pass readily into the perforations 30 and thence out through the perforations 29.

In Figs. 7 to 12 inclusive, we show still another form of screen. In this embodiment of our invention, the screen is composed of a woven wire fabric. We have found that such a screen can be made in which the interstices between the wires are inclined at such an angle to the surface of the screen that when the screen is held to the light with its surface normal to the line of vision it will appear to be opaque, but when held at an angle of about 45 degrees to the line of vision in the direction of the warp wires, openings will show therethrough. The particular weave which gives this result is a form of twill in which the warp wires are of a larger diameter than the weft wires and are not crimped. The weft wires, on the other hand, are arranged to pass over and under alternate pairs of warp wires and are lapped over one another in such a manner as to produce a double layered fabric with the surface on one side exactly like the surface on the other.

A study of the drawings will show that this wire fabric is composed of a recurring series of four weft wires marked 1, 2, 3 and 4, respectively. The warp wires are designated by reference letters $a$, $b$, $c$, etc. The relative positions of weft wires 1 and 3 are shown in Fig. 7, and the relative positions of weft wires 2 and 4 in Fig. 8. Thus wire 1 after passing over warp wire $a$ passes under the next two warp wires $b$ and $c$, over warp wires $d$ and $e$, under warp wires $f$ and $g$, etc. The next adjacent weft wire 2 is staggered with respect to wire 1, since it passes over wires $a$ and $b$, under wires $c$ and $d$, over $e$ and $f$, under $g$ and $h$, etc. Weft wire 3 bears an opposed relation to wire 1, since it passes over the warp wires that wire 1 passes under, and under the warp wires that wire 1 passes over. Weft wire 4 bears a similar opposed relation to wire 2. Each weft wire is helically crimped so as to directly overlie its opposed wire. This is clearly shown in Fig. 9, wherein the helical crimping of wires 2 and 4 is such that wire 4 when in one face of the screen directly overlaps wire 2 on the opposite side of the screen. Similarly, wires 1 and 3 are crimped to lap one directly over the other.

As shown in Fig. 10, there is no opening through which rays of light normal to the surface of the screen may pass. However, where the wires are helically crimped between the warp wires clear openings are formed through the fabric, but these openings are disposed at angles of about 45 degrees, as indicated by the arrows in Fig. 10. This angle may be varied by changing the ratio of the diameter of the warp wires with respect to the weft wires but it is essential that said angle be greater than the angle of incidence of the projected light rays.

The wire of which the screen is formed may be composed of a lustrous metal or it may be plated or otherwise treated, either before or after weaving to give it a suitable reflecting surface. However, for ordinary purposes it is preferable to coat the screen with a white pigment and when thus coated the reflecting qualities of the wire stock are immaterial. When the screen is coated care must be taken not to close the interstices in the fabric.

While the wire screen as so far described is serviceable, we have found that it may be improved by subjecting it to a calendering operation. The screen is passed through rolls which compress and flatten the weft wires where they pass over the warp wires. This results in reducing the ridges formed over the warp wires and giving a flatter surface. The result of the calendering operation is clearly shown in Figs.

11 and 12. The weft wires are caused to bite into the warp wires and exteriorly are formed with flattened spots 32. It will be understood that the wire fabric screen is shown on a greatly magnified scale in the drawings and that actually the screen presents a very smooth surface excellently adapted for motion pictures.

It will be noted that the opposite faces of the screen, after as well as before calendering, are alike and consequently the screen is reversible. Hence, if one face of the screen becomes tarnished or is otherwise soiled, marred or injured, the screen may be reversed to present a fresh surface for the projected rays.

While we have described certain specific embodiments of our invention, it will be understood that these are to be taken as illustrative and not limitative of the invention and that we reserve the right to make such changes in form, construction and arrangement of parts as fall within the spirit and scope of the following claims.

We claim:

1. A sound picture screen consisting of a sheet-like structure comprising two spaced layers of metal, each layer being formed with openings therethrough, and spacing means between said layers intermediate their ends, the openings in one layer being offset with respect to those in the other layer.

2. A sound picture screen consisting of a sheet-like structure comprising two spaced layers of metal, each layer being formed with openings therethrough, and spacing means between said layers intermediate their ends, the openings in one layer being offset with respect to those in the other layer, and the outer face of one layer and the inner face of the other layer presenting a light reflecting surface.

3. A sound picture screen consisting of a sheet-like structure comprising two spaced layers of metal, each layer being formed with openings therethrough, and spacing means between said layers intermediate their ends, the openings in one layer being offset with respect to those in the other layer, and the outer face of one layer and the inner face of the other layer being coated with a light reflecting material.

4. A sound picture screen, comprising a closely woven wire fabric formed with passages therethrough inclined at an angle not less than 15 degrees from normal to the screen.

5. A motion picture screen, comprising a closely woven wire fabric, said fabric being formed of uncrimped warp wires with weft wires woven over and under the warp wires, and the weft wires being helically crimped so that each weft wire overlaps a preceding weft wire.

6. A motion picture screen, comprising a closely woven wire fabric, said fabric being formed of uncrimped warp wires with weft wires woven over and under the warp wires, each weft wire being helically crimped to overlap a preceding weft wire and each weft wire being flattened where it passes a warp wire.

7. A motion picture screen, comprising a closely woven wire fabric, said fabric being formed of uncrimped warp wires with weft wires woven over and under the warp wires, each weft wire being helically crimped to overlap a preceding weft wire and each weft wire being flattened where it passes a warp wire, and a surface of the fabric being coated with a light reflecting material.

8. A motion picture screen, comprising a closely woven wire fabric, said fabric being formed of uncrimped warp wires with weft wires woven over and under the warp wires, each weft wire being helically crimped to overlap a preceding weft wire and each weft wire being flattened where it passes a warp wire, and a surface of the fabric being plated with a lustrous metal.

9. The method of forming a sound picture screen which consists in weaving weft wires over and under uncrimped warp wires, helically crimping the weft wires to form a double layered fabric with each weft wire overlapping the preceding weft wire, and plating the fabric thus formed.

10. The method of forming a sound picture screen which consists in weaving weft wires over and under uncrimped warp wires, helically crimping the weft wires to form a double layered fabric with each weft wire overlapping the preceding weft wire, and coating at least one face of the fabric with a light reflecting material.

11. The method of making a sound picture screen which consists in forming a metallic wire fabric by weaving weft wires over and under uncrimped warp wires, helically crimping the weft wires to form a double layered fabric with each weft wire overlapping a preceding weft wire, and calendering the fabric thus formed.

12. The method of making a sound picture screen which consists in forming a metallic wire fabric by weaving weft wires over and under uncrimped warp wires, helically crimping the weft wires to form a double layered fabric with each weft wire overlapping a preceding weft wire, and flattening each weft wire where it passes a warp wire.

13. The method of making a sound picture screen which consists in forming a metallic wire fabric by weaving weft wires over and under uncrimped warp wires, helically crimping the weft wires to form a double layered fabric with each weft wire overlapping a preceding weft wire, calendering the fabric thus formed, and coating at least one face of the fabric with a light reflecting material.

14. A sound picture screen consisting of a closely woven wire fabric comprising warp and weft wires, the warp wires completely covering the weft wires on a face of the screen and leaving tortuous openings through the screen for the passage of sound waves.

15. A sound picture screen consisting of a closely woven wire fabric comprising warp and weft wires, the warp wires completely covering the weft wires on each face of the screen and leaving tortuous openings through the screen for the passage of sound waves.

16. A sound picture screen consisting of a sheet-like structure comprising two spaced layers of metal, each layer being formed with openings therethrough, the openings in one layer being offset with respect to those of the other layer, and spacing means between the layers intermediate their ends, said spacing means consisting of corrugations formed on one of the layers.

MILTON MAJOR.
HENRY H. RENNELL.